UNITED STATES PATENT OFFICE.

THILO KROEBER, OF BASEL, SWITZERLAND, ASSIGNOR TO THE FIRM OF SOCIETY OF CHEMICAL INDUSTRY IN BASLE, OF BASEL, SWITZERLAND.

MONOAZO DYE AND PROCESS OF MAKING SAME.

No. 12,555. Specification of Reissued Letters Patent. Reissued Nov. 13, 1906.

Original No. 805,918, dated November 28, 1905. Application for reissue filed August 1, 1906. Serial No. 328,818.

*To all whom it may concern:*

Be it known that I, THILO KROEBER, chemist and doctor of philosophy, a subject of the Duke of Saxe-Altenburg, and a resident of Basel, Switzerland, have invented new and useful Improvements in the Manufacture of Monoazo Dyestuffs, of which the following is a clear and complete specification.

The invention relates to the manufacture of new monoazo dyestuffs derived from 1-amido - 2 - acidyloxynaphthalene-sulfonic acids and sulfonic acids of 1-8-dioxynaphthalene, according to the general process described in an application for Letters Patent executed by me and Carl Jagerspacher, said application having been filed May 23, 1905, and bearing the Serial No. 261,897.

These new monoazo dyestuffs dissolve in water with violet-blue to blue coloration in concentrated sulfuric acid with greenish-blue coloration and dye unmordanted wool in clear blue shades which become bluish green on treatment with chromium compounds—as, for instance, potassium bichromate.

The following example illustrates the manufacture of the new dyestuffs: 23.9 kilos of 1:2-amidonaphthol-4-sulfonic acid are dissolved in two hundred liters of water with aid of twenty-nine kilos of soda-lye of thirty-per-cent. NaOH and acetylized by means of eleven kilos of acetic anhydrid at a temperature below 0° centigrade, while good stirring is maintained. After a few minutes there are added to the solution, which should have neutral or feebly alkaline reaction, seven kilos of solid sodium nitrate, and the whole is acidified at 0° centigrade by adding all at once thirty kilos of ordinary hydrochloric acid, whereupon the mass immediately solidifies without any evolution of gas to a yellow crystalline magma. This diazo compound is allowed to flow into a solution of thirty-two kilos of 1-8-dioxynaphthalene-3-6-disulfonic acid containing an excess of soda. A violet dyestuff is at once formed, which by continued stirring passes to a blue dyestuff, whose isolation is conducted, as usual, by salting out. It dissolves in water with a pure violet-blue coloration and in concentrated sulfuric acid with a green-blue coloration. It dyes wool in an acid-bath blue tints, which pass to bluish green on treatment with chromium compounds. Analogous dyestuffs are obtained if 1-8-dioxynaphthalene-3-6-disulfonic acid be replaced by other sulfo derivatives of 1-8-dioxynaphthalene—as, for instance, 1-8-dioxynaphthalene-4-monosulfonic acid, 1-8-dioxynaphthalene-2-4-disulfonic acid, or 1-8-dioxynaphthalene-4-6-disulfonic acid.

Instead of the 1-2-amidonaphthol-4-sulfonic acid mentioned in the example other sulfo derivatives of 1-2-amidonaphthol—as, for instance, 1-2-amidonaphthol-6-sulfonic acid, 1-2-amidonaphthol-4-6-disulfonic acid, or 1-2-amidonaphthol-3-6-disulfonic acid—may be employed.

What I claim is—

1. The process for the manufacture of monoazo dyestuffs, which consists in acidylizing 1-2-amidonaphthol sulfonic acids in the hydroxyl group, then diazotizing the so-obtained 1-amido-2-acidyloxynaphthalenesulfonic acids and combining the resulting diazo compounds with sulfonic acids of 1:8-dioxynaphthalene.

2. The process for the manufacture of monoazo dyestuffs, which consists in acetylizing 1-2-amidonaphtholsulfonic acids in the hydroxyl group, then diazotizing the so-obtained 1-amido-2-acetyloxynaphthalenesulfonic acids and combining the resulting diazo compounds with sulfonic acids of 1-8-dioxynaphthalene.

3. The process for the manufacture of a monoazo dyestuff, which process consists in acetylizing 1-2-amidonaphthol-4-sulfonic acid in the hydroxyl-group, then diazotizing the obtained 1-amido-2-acetoxynaphthalene-4-sulfonic acid and combining the resulting diazo compound with 1-8-dioxynaphthalene-3-6-disulfonic acid.

4. As new products, the monoazo dyestuffs derived from sulfonic acids of 1-2-amidonaphthol and sulfonic acids of 1-8-dioxynaphthalene, which dyestuffs dissolve in water with violet-blue to blue coloration, and in concentrated sulfuric acid with greenish-blue coloration and dye unmordanted wool in clear blue shades, which shades become bluish green on treatment with chromium compounds.

5. As a new product, the monoazo dyestuff derived from 1-2-amidonaphthol-4-sulfonic acid and 1-8-dioxynaphthalene-3-6-disulfonic acid, which dyestuff is soluble in water with a pure violet-blue color, soluble in concentrated sulfuric acid with a greenish-blue color and dyes unmordanted wool in clear blue shades, which become bluish green on treatment with chromium compounds.

In witness whereof I have hereunto signed my name, this 13th day of July, 1906, in the presence of two subscribing witnesses.

THILO KROEBER.

Witnesses:
GEO. GIFFORD,
AMAND RITTER.